United States Patent [19]

McCloskey

[11] 4,139,245
[45] Feb. 13, 1979

[54] VIBRATION DAMPING IN MACHINE ELEMENT BEARINGS

[75] Inventor: Albert R. McCloskey, Fairfield, Conn.

[73] Assignee: The Heim Universal Corp., Fairfield, Conn.

[21] Appl. No.: 803,278

[22] Filed: Jun. 3, 1977

[51] Int. Cl.² .......................... F16C 9/06; F16C 27/06
[52] U.S. Cl. ...................................... 308/26; 280/506; 308/72; 403/149; 403/157
[58] Field of Search .................... 308/72, 26, 163; 280/506; 403/225, 226, 149, 157, 158; 29/149.5 B; 64/17 R; 188/1 B

[56] References Cited

U.S. PATENT DOCUMENTS

| 3,107,954 | 10/1963 | Rudy | 308/72 |
| 3,552,785 | 1/1971 | Elder et al. | 403/225 X |
| 3,806,158 | 4/1974 | Casey | 308/72 X |

Primary Examiner—Galen L. Barefoot
Assistant Examiner—Douglas C. Butler
Attorney, Agent, or Firm—James C. Wray

[57] ABSTRACT

Vibration damping annular elastomeric members are mounted between outer spherical bearing members and elements which are attached to inner spherical bearing members to prevent vibrations between the elements and the outer bearing members.

The elastomeric members extend outwardly beyond the connection between the inner bearing member and the elements so that the elastomeric members are compressed as the elements are connected to the inner bearing member.

14 Claims, 6 Drawing Figures

VIBRATION DAMPING IN MACHINE ELEMENT BEARINGS

BACKGROUND OF THE INVENTION

The vibration damping means for bearings mounted in machine elements as disclosed herein are useful in bearings such as described in U.S. Pat. Nos. 3,369,285 and 3,825,983. In applications of bearings in machine elements, bearings are subjected to vibrations which cause premature failure of bearings, elements, and connectors.

In application such as in jet engines, levers attached to bearings are subjected to severe vibrations which cause premature bearing failures.

A problem exists in how to prevent the bearing failures with equipment which does not add appreciable cost and complexity to such engines and the controls for such engines.

SUMMARY OF THE INVENTION

Vibration damping annular elastomeric members are mounted between outer spherical bearing members and elements which are attached to inner spherical bearing members to prevent vibrations between the elements and the outer bearing members.

An elastomeric ring is mounted on a surface of the outer bearing member and is compressed between that surface and the surface of an element which is connected to an inner bearing member. The elastomeric ring extends slightly beyond the outward extension of the inner member and the connection between the inner member and the element so that as the element is attached to the inner member the elastomeric ring is compressed between surfaces of the element and surfaces of the outer bearing member. The elastomeric ring therefore dampens damaging vibrations and prolongs bearing lives.

A preferred embodiment of an elastomeric vibration damping member has an O-ring shape. Surfaces of the O-ring may be bonded to the surfaces of the outer bearing member or to surfaces of the elements, or the O-ring may be mechanically fixed such as by stretching the elements over surfaces of the outer bearing member or by compressing the elastomeric members between the elements and outer bearing member surfaces.

One object of the invention is the provision of a bearing assembly having an inner member with an outer bearing surface, an outer bearing member having an inner bearing surface, an outer bearing member having an inner bearing surface juxtaposed to the outer bearing surface of the inner member, and an elastomeric member secured with respect to the outer member.

Another object of the invention is the provision of a bearing with an elastomeric member mounted between the outer bearing member and an element connected to the inner bearing member.

A further object of the invention is the provision of a bearing in which an annular outer member radially surrounds the inner member, and wherein the elastomeric member is positioned around the outer member.

Another object of the invention is the provision of a spherical bearing with an elastomeric member bonded to the outer member.

A further object of the invention is the provision of a spherical bearing with an outer member having a flat face and an inner member extending axially outward from the outer member beyond a plane of the flat face, and wherein an elastomeric member is positioned on the flat face and extends axially outward from the flat face beyond an outward extension of the inner member.

Another object of the invention is the provision of an annular elastomeric ring which lies on a face of an outer member of a spherical bearing.

These and other and further objects and features of the invention are apparent in the disclosure which includes the above and ongoing specification and claims and the drawings.

DETAILED DESCRIPTION OF THE DRAWINGS

Figure 1:
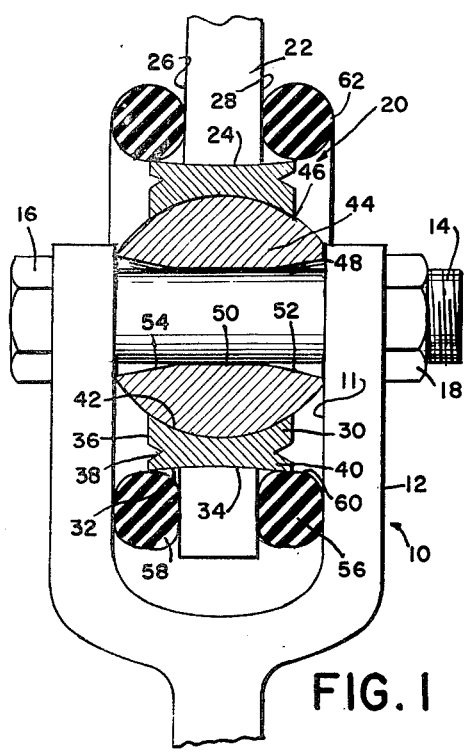
FIG. 1 shows an assembled view of the vibration damping apparatus of the present invention.

Referring to FIG. 1, a spherical bearing is shown with vibration damping members positioned between an outer bearing member and a clevis which is attached to an inner bearing member.

The clevis is generally indicated by the numeral 10 and has parallel inner surfaces 11 on legs 12. A bolt 14 with a head 16 and a nut 18 connects the clevis to an inner bearing member. The outer bearing member, which is generally indicated by the numeral 20 comprises a machine element 22 with an annular inner opening 24 which is connected to an outer bearing element. Side walls 26 and 28 of element 22 receive and compress the vibration damping members.

Outer bearing element 30 has an annular outer wall 34 which fits within the annular opening 24 of machine element 22, which together with the outer bearing element 30 form the outer bearing member.

Side walls 36 of elements 30 have staking grooves 38 which enable edge portions 40 to be bent outward, forming the curved surfaces 32 which hold elements 22 and 30 assembled. A spherical inner surface 42 of element 30 forms an inner bearing surface of the outer bearing member.

A complementary spherical surface 46 on the inner bearing member 44 is the outer bearing surface on the inner member.

The inner member or ball 44 has a flat outer face 48. An inner bore 50 having outward tapered openings 52 and 54 receives the bolt 14.

In practice, the inner faces 11 of the clevis make contact with the outer faces 48 of the ball member 44 in close tolerance, and bolt 14 may fit closely within bore 50, or within collets inserted in tapered sections 52 and 54 of the bore.

To damp vibrations in use, one or more annular vibration damping members 56 and 58 are placed on the outer bearing member 20 and are slightly compressed between the inner surfaces 11 of the clevis and the outer surfaces 26 and 28 of element 22 of the outer bearing member. The vibration damping members 56 and 58 may be mechanically held in place such as by expanding the members slightly over the outward turned portions 40 of the bearing element 30. Inner annular surfaces 60 of the damping members 56 and 58 mechanically engage the corners 40 to hold the damping members assembled on the bearing. Further compression of the outer surfaces 62 of the damping members by the inner surfaces 11 of the clevis further mechanically holds the damping members assembled on the bearings.

Figure 2:
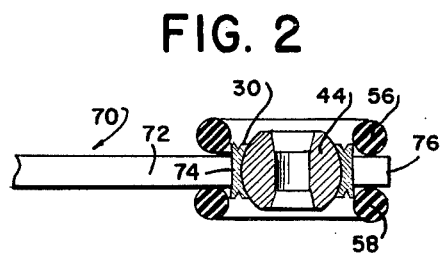
FIG. 2 is a detail of elements of FIG. 1
Figure 3:
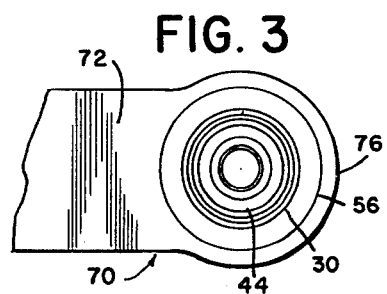
FIG. 3 is a side view of elements shown in FIGS. 1 and 2.

In FIGS. 2 and 3 the outer bearing element 70 comprises a flattened rod end 72 having an annular inward opening 74 and a curved outer periphery 76. The vibration damping members 56, 58 are shown held on the bearing components. The damping elements may be bonded to the flat surfaces of the outer bearing member.

Generally, the vibration damping members are annular elastomeric rings. More specifically, the elastomeric damping members 56 and 58 shown in FIGS. 1-3 have an O-ring shape.

Figure 4:
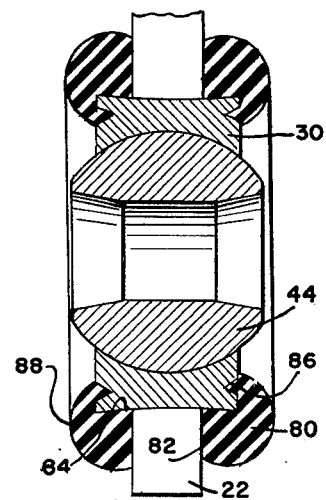
FIGS. 4, 5 and 6 are modified forms of the vibration damping apparatus.

In FIG. 4, a modified form of the vibration damping members, 80, is shown. The damping members have flat surfaces 82 which may be bonded to flat outer surfaces of element 22 and have inward directed surfaces 84 which correspond with surfaces 32 as shown in FIG. 1 of element 30. Projections 86 in the damping member fit within the staking groove. In this form of the invention, the mating surfaces of the damping members 80 may be bonded to the elements 22 and 30, or the members are mechanically held in position.

Figure 5:
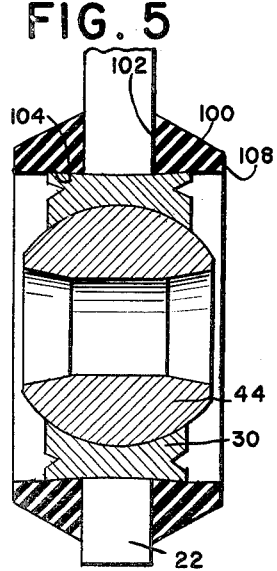
Figure 6:
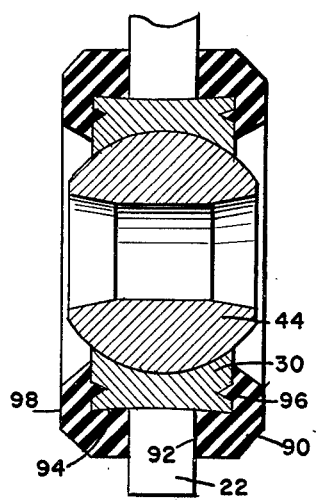

FIGS. 5 and 6 show further modifications of polygonal damping members 90 and 100. Surfaces 92, 94 and 96 fit complementary surfaces of the outer bearing elements 22 and 30, and may be bonded thereto and flat outer surface 98 has a function similar to the curved outer surfaces 88 and 62 of the earlier shown embodiments.

In the embodiment referred to by the numeral 100, flat surfaces 102 and 104 abut adjacent surfaces of elements 22 and 30 and may be bonded thereto. Flat outer surface 108 abuts the inner surface of the clevis attached to the inner bearing member 44.

As shown in all the drawings, it is preferred that the surfaces 62, 88, 98 and 108 extend outward beyond the outer flat surfaces 48 of the inner bearing members 44 so that the damping members are compressed against the outer bearing members by clevises attached to the inner bearing members 44.

While the invention has been described in part with reference to specific embodiments, it will be obvious that modifications and variations of the invention may be made without departing from the scope of the invention, which is defined in the following claims.

I claim:

1. Bearing apparatus having an inner member with an outer bearing surface, an outer bearing member having an inner bearing surface juxtaposed to the outer bearing surface of the inner member, and an elastomeric member secured with respect to the outer member and wherein the outer member is annular and radially surrounds the inner member, and wherein the elastomeric member is positioned around the outer member.

2. The apparatus of claim 1 wherein the elastomeric member bears against the outer member and an element connected to the inner member.

3. The apparatus of claim 1 wherein the elastomeric member is bonded to the outer member.

4. The apparatus of claim 1 wherein the outer member has a flat face and wherein the inner member extends outward from the outer member beyond a plane of the flat face, and wherein the elastomeric member is positioned on the flat face and extends outward from the flat face beyond an outward extension of the inner member.

5. The apparatus of claim 4 wherein the elastomeric member is an annular ring which lies on a face of the outer member.

6. The apparatus of claim 1 wherein the outer member extends outward in a first direction from the inner member, wherein the inner member projects from the outer member in a direction perpendicular to the first direction, and wherein the inner member has connected thereto in outward extension from the outer member, an element which extends substantially parallel to the outer member in the first direction and the elastomeric member is interposed between the element and the outer member and bears against the element and the outer member.

7. The apparatus of claim 6 wherein the elastomeric member is mechanically fixed between the element and the outer member.

8. The apparatus of claim 6 wherein the elastomeric member is annular.

9. The apparatus of claim 8 wherein the elastomeric member is an O-ring.

10. The apparatus of claim 8 wherein the elastomeric member has a generally round outer configuration and angular inward configurations adjacent the outer member.

11. The apparatus of claim 8 wherein the elastomeric member comprises a polygonal cross section and a flat outer face parallel to an outer face of the outer member.

12. The apparatus of claim 1 wherein the elastomeric member is circumferentially spaced about the inner member.

13. The apparatus of claim 1 wherein the elastomeric member is spaced a distance from the inner member.

14. Bearing apparatus having an inner member with an outer bearing surface, an annular outer bearing member having an inner bearing surface radially surrounding and juxtaposed to the outer bearing surface of the inner member, and an elastomeric member secured with respect to the outer member and extending around axially outwardly beyond the inner and outer bearing members.

* * * * *